US008663762B2

(12) United States Patent
Mazany et al.

(10) Patent No.: US 8,663,762 B2
(45) Date of Patent: Mar. 4, 2014

(54) HIGH-STRENGTH LIGHTWEIGHT FABRIC FOR INFLATABLE STRUCTURES

(75) Inventors: Anthony M. Mazany, Amelia Island, FL (US); Robert Bianco, Strongsville, OH (US); Ray K George, Scottsdale, AZ (US)

(73) Assignee: Goodrich Corporation, Charlotte, NC (US)

( * ) Notice: Subject to any disclaimer, the term of this patent is extended or adjusted under 35 U.S.C. 154(b) by 57 days.

(21) Appl. No.: 13/490,083

(22) Filed: Jun. 6, 2012

(65) Prior Publication Data

US 2012/0315407 A1 Dec. 13, 2012

Related U.S. Application Data

(60) Provisional application No. 61/494,759, filed on Jun. 8, 2011.

(51) Int. Cl.
*B29D 22/00* (2006.01)
*B60R 21/06* (2006.01)

(52) U.S. Cl.
USPC .......................... 428/35.7; 977/734; 442/141

(58) Field of Classification Search
USPC .......... 977/701, 734, 961; 428/12, 35.7, 36.9, 428/36.92, 36.1, 36.3; 28/169; 442/85, 86, 442/134, 136, 138, 141
See application file for complete search history.

(56) References Cited

U.S. PATENT DOCUMENTS

| 6,581,334 | B2 | 6/2003 | Oney et al. |
| 2004/0022981 | A1 | 2/2004 | Hu |
| 2007/0048209 | A1 | 3/2007 | Smalley |
| 2007/0104947 | A1 | 5/2007 | Shambaugh |
| 2008/0103444 | A1 | 5/2008 | Jimenez |
| 2010/0096595 | A1 | 4/2010 | Prudhomme |

OTHER PUBLICATIONS

Exfoliated Graphite Nanoplatelets (xGnP)—A Carbon Nanotube Alternative for Modifying the Properties of Polymers and Composites. Professor Lawrence T. Drzal, Michigan State University.

*Primary Examiner* — Arti Singh-Pandey
(74) *Attorney, Agent, or Firm* — Cantor Colburn LLP

(57) ABSTRACT

A high-strength, lightweight inflatable structure is formed of at least one flexible fabric member that, in an inflated condition, forms a self-supporting structure. The flexible fabric member is formed from a bare fabric having an areal weight of less than 4.5 oz/yd$^2$. The fabric is coated with air-impervious resin coating comprising a polyurethane resin having a mixture of graphene nanoplatelets and a phosphorus-based flame retardant added thereto. The thermally exfoliated graphene nanoplatelets contain residual graphene oxide. Graphene oxide, which is a polar molecule, has an affinity for the polar molecules that make up the phosphorus based flame retardant. Accordingly, in addition to its inherent flame-retardant properties, the phosphorus based flame retardant acts as a dispersant to improve the uniform dispersion of the graphene nanoplatelets within the matrix, thus reducing or eliminating the need to use additional dispersants.

18 Claims, 15 Drawing Sheets

| Component | Function | Formulation | | | | | | | | | |
|---|---|---|---|---|---|---|---|---|---|---|---|
| | | B | B1 | B2 | B2A | C1 | C2 | C2A | C3A | D3 |
| Toluene | Solvent | 50.0 | 50.0 | 50.0 | 80.0 | 50.0 | 50.0 | 80.0 | 66.7 | 66.7 |
| DMF | Solvent | 10.0 | 10.0 | 10.0 | 12.0 | 10.0 | 10.0 | 12.0 | 13.3 | 13.3 |
| Water | Solvent | - | - | - | - | - | - | - | - | - |
| MMP | Solvent | - | - | - | - | - | - | - | - | - |
| GNP-MSTC | Nanoplatelets | 2.0 | - | - | - | - | - | - | - | - |
| XG Sciences - M5 | Nanoplatelets | - | 2.0 | - | - | - | - | - | - | - |
| XG Sciences - M25 | Nanoplatelets | - | - | 2.0 | 2.0 | 2.0 | 2.0 | 2.0 | 2.0 | 2.0 |
| Alamine 308 | Suspension agent | 0.50 | 0.50 | 0.50 | 0.50 | 0.50 | 0.50 | 0.50 | 0.50 | 0.50 |
| PVP | Suspension agent | - | - | - | - | - | - | - | - | - |
| Dow Corning Z-6040 | Coupling agent | - | - | - | - | 1.0 | - | - | - | - |
| Dow Corning Z-6011 | Coupling agent | - | - | - | - | - | 1.0 | 1.0 | 1.0 | 1.0 |
| Irgaguard F 3000 | Fungicide | 0.25 | 0.25 | 0.25 | 0.10 | 0.25 | 0.25 | 0.25 | 0.25 | 0.25 |
| Saytex 8010 | Br-flame retardant | 3.0 | 3.0 | 3.0 | 3.0 | 3.0 | 3.0 | 3.0 | 6.0 | 6.0 |
| TBEP | P-flame retardant | 2.5 | 2.5 | 2.5 | 2.5 | 2.5 | 2.5 | 2.5 | 5.0 | 6.0 |
| Sb2O3 | Sb-flame retardant | - | - | - | - | - | - | - | - | - |
| Stahl Permuthane SU21-591 | Resin | - | - | - | - | 200.0 | 200.0 | 200.0 | 200.0 | 100.0 |
| Stahl Permuthane SU26-260 | Resin | - | - | - | - | - | - | - | - | - |
| Stahl Permuthane SU21-760 | Resin | - | - | - | - | - | - | - | - | - |
| Bayer Impranil ELH | Resin | 160.0 | 160.0 | 160.0 | 160.0 | - | - | - | - | - |
| Bayer Impranil EWN-13 | Resin | - | - | - | - | - | - | - | - | - |
| Stahl Permuthane RU21-074 | Resin (WB) | - | - | - | - | - | - | - | - | 100.0 |
| Bayer Imprafix TH Solution | Crosslinker | - | - | - | - | - | - | - | 2.0 | - |

Fig. 4

| Component | Function | E | F | G | W1 | C4 | C5 | D2 | D2A | G1 |
|---|---|---|---|---|---|---|---|---|---|---|
| Toluene | Solvent | 66.7 | 66.7 | 66.7 | - | 66.7 | 66.7 | 66.7 | 66.7 | 66.7 |
| DMF | Solvent | 13.3 | 13.3 | 13.3 | 10.0 | 13.3 | 13.3 | 13.3 | 13.3 | 13.3 |
| Water | Solvent | - | - | - | 66.7 | - | - | - | - | - |
| NMP | Solvent | - | - | - | 13.3 | - | - | - | - | - |
| GNP-MSTC | Nanoplatelets | - | - | - | - | - | - | - | - | - |
| XG Sciences - M5 | Nanoplatelets | - | - | - | - | - | - | - | - | - |
| XG Sciences - M25 | Nanoplatelets | 2.0 | 2.0 | 2.0 | 2.0 | 2.0 | 2.0 | 2.0 | 2.0 | 2.0 |
| Alamine 308 | Suspension agent | 0.50 | 0.50 | 0.50 | - | 0.50 | 0.50 | 0.50 | 0.50 | 0.50 |
| PVP | Suspension agent | - | - | - | 0.50 | - | - | - | - | - |
| Dow Corning Z-6040 | Coupling agent | 0.10 | 1.0 | 1.0 | 0.5 | 2.0 | 2.0 | 1.5 | 1.5 | 1.0 |
| Dow Corning Z-6011 | Coupling agent | 0.25 | 0.25 | 0.25 | 0.30 | 0.25 | 0.25 | 0.25 | 0.25 | 0.25 |
| Irgaguard F3000 | Fungicide | - | - | - | - | - | - | - | - | - |
| Saytex 8010 | Br-flame retardant | 3.0 | 3.0 | 3.0 | 3.0 | 3.0 | 3.0 | 3.0 | 6.0 | 6.0 |
| TBEP | P-flame retardant | 2.5 | 2.5 | 2.5 | 2.5 | 2.5 | 2.5 | 2.5 | 6.0 | 6.0 |
| $Sb_2O_3$ | Sb-flame retardant | - | - | - | - | - | - | - | - | - |
| Stahl Permuthane SU21-591 | Resin | - | - | 100.0 | - | 200.0 | 200.0 | 100.0 | 100.0 | 100.0 |
| Stahl Permuthane SU26-260 | Resin | - | 180.0 | 100.0 | - | - | - | 100.0 | - | - |
| Stahl Permuthane SU21-760 | Resin | - | 180.0 | 100.0 | - | - | - | - | - | - |
| Bayer Impranil ELH | Resin | 80.0 | - | - | - | - | - | - | - | - |
| Bayer Impranil EWN-13 | Resin | 80.0 | - | - | - | - | - | - | - | 100.0 |
| Stahl Permuthane RU21-074 | Resin (WB) | - | - | - | 200.0 | - | - | - | 100.0 | - |
| Bayer Imprafix TH Solution | Crosslinker | - | - | - | - | 2.0 | 4.0 | 2.0 | 2.0 | - |

Fig. 5

| Component | Function | G2 | G3 | H1 | H1A | H2 | J1 | J2 | J3 | K1 |
|---|---|---|---|---|---|---|---|---|---|---|
| Toluene | Solvent | 66.7 | 66.7 | 66.7 | 66.7 | 66.7 | 66.7 | 66.7 | 66.7 | 66.7 |
| DMF | Solvent | 13.3 | 13.3 | 13.3 | 13.3 | 13.3 | 13.3 | 13.3 | 13.3 | 13.3 |
| Water | Solvent | - | - | - | - | - | - | - | - | - |
| NMP | Solvent | - | - | - | - | - | - | - | - | - |
| GNP-MSTC | Nanoplatelets | - | - | - | - | - | - | - | - | - |
| XG Sciences - M5 | Nanoplatelets | - | - | - | - | - | - | - | - | - |
| XG Sciences - M25 | Nanoplatelets | 2.0 | 2.0 | 2.0 | 2.0 | 2.0 | 2.0 | 2.0 | 2.0 | 2.0 |
| Alamine 308 | Suspension agent | 0.50 | 0.50 | 0.50 | 0.50 | 0.50 | 0.50 | 0.50 | 0.50 | 0.50 |
| PVP | Suspension agent | - | - | - | - | - | - | - | - | - |
| Dow Corning Z-6040 | Coupling agent | 1.0 | 1.0 | 1.0 | 1.0 | 1.0 | 1.5 | 1.5 | 1.5 | 1.5 |
| Dow Corning Z-6011 | Coupling agent | 0.25 | 0.25 | 0.25 | 0.25 | 0.25 | 0.25 | 0.25 | 0.25 | 0.25 |
| Irgaguard F3000 | Fungicide | 6.0 | 9.0 | 9.0 | 9.0 | 9.0 | 9.0 | 9.0 | 9.0 | 9.0 |
| Saytex 8010 | Br-flame retardant | 6.0 | 4.0 | 4.0 | 4.0 | 4.0 | 3.0 | 3.0 | 3.0 | 9.0 |
| TBEP | P-flame retardant | - | - | - | - | - | - | - | - | 6.0 |
| Sb₂O₃ | Sb-flame retardant | - | - | - | - | - | - | - | - | - |
| Stahl Permuthane SU21-591 | Resin | 100.0 | 100.0 | 150.0 | 150.0 | 175.0 | 100.0 | 100.0 | 100.0 | - |
| Stahl Permuthane SU26-260 | Resin | - | - | - | - | - | - | - | - | 100.0 |
| Stahl Permuthane SU21-760 | Resin | 100.0 | 100.0 | - | - | - | - | - | - | - |
| Bayer Impranil ELH | Resin | - | - | 50.0 | 50.0 | 25.0 | 100.0 | 100.0 | 100.0 | 100.0 |
| Bayer Impranil EWN-13 | Resin (WB) | - | - | - | - | - | - | - | - | - |
| Bayer Imprafix RU21-074 | Resin (WB) | - | - | - | - | - | - | - | - | - |
| Bayer Imprafix TH Solution | Crosslinker | 2.0 | 2.0 | 2.0 | 0.5 | 0.5 | 2.0 | 2.0 | 2.0 | - |

Fig. 6

| Component | Function | K2 | L1 | L2 | D4 | M1 | M2 | M3 | M4 | M5 |
|---|---|---|---|---|---|---|---|---|---|---|
| Toluene | Solvent | 66.7 | 66.7 | 66.7 | 66.7 | 66.7 | 66.7 | 66.7 | 66.7 | 66.7 |
| DMF | Solvent | 13.3 | 13.3 | 13.3 | 13.3 | 13.3 | 13.3 | 13.3 | 13.3 | 13.3 |
| Water | Solvent | - | - | - | - | - | - | - | - | - |
| NMP | Solvent | - | - | - | - | - | - | - | - | - |
| GNP-MSTC | Nanoplatelets | - | - | - | - | - | - | - | - | - |
| XG Sciences - M5 | Nanoplatelets | - | - | - | - | - | - | - | - | 5.0 |
| XG Sciences - M25 | Nanoplatelets | 2.0 | 2.0 | 2.0 | 4.0 | 2.0 | 2.0 | 2.0 | 4.0 | - |
| Alamine 308 | Suspension agent | 0.50 | 0.50 | 0.50 | 0.50 | 0.50 | 0.50 | 0.50 | 0.50 | 0.50 |
| PVP | Suspension agent | - | - | - | - | - | - | - | - | - |
| Dow Corning Z-6040 | Coupling agent | - | - | - | - | - | - | - | - | - |
| Dow Corning Z-6011 | Coupling agent | 1.5 | 1.5 | 1.5 | 1.5 | 1.5 | 1.5 | 1.5 | 1.5 | 1.5 |
| Ingaguard F3000 | Fungicide | 0.25 | 0.25 | 0.25 | 0.25 | 0.25 | 0.25 | 0.25 | 0.25 | 0.25 |
| Saytex 8010 | Br-flame retardant | 6.0 | 9.0 | 9.0 | 6.0 | 6.0 | 6.0 | 6.0 | 6.0 | 6.0 |
| TBEP | P-flame retardant | 9.0 | 6.0 | 9.0 | 9.0 | 6.0 | 6.0 | 6.0 | 6.0 | 6.0 |
| $Sb_2O_3$ | Sb-flame retardant | - | - | - | - | 2.0 | 4.0 | 2.0 | 2.0 | 2.0 |
| Stahl Permuthane SU21-591 | Resin | - | 100.0 | 100.0 | 100.0 | 100.0 | 100.0 | 100.0 | 100.0 | 100.0 |
| Stahl Permuthane SU26-260 | Resin | 100.0 | - | - | - | - | - | - | - | - |
| Stahl Permuthane SU21-760 | Resin | - | - | 100.0 | - | - | - | - | - | - |
| Bayer Impranil ELH | Resin | - | 100.0 | - | - | - | - | - | - | - |
| Bayer Impranil EWN-13 | Resin | 100.0 | - | - | 100.0 | 100.0 | 100.0 | 100.0 | 100.0 | 100.0 |
| Stahl Permutex RU21-074 | Resin (WB) | - | - | - | - | - | - | - | - | - |
| Bayer Imprafix TH Solution | Crosslinker | - | - | - | - | - | - | - | - | - |

Fig. 7

| Component | Function | D | D5 | D6 | P1 | P2 | P3 |
|---|---|---|---|---|---|---|---|
| Toluene | Solvent | 66.7 | 66.7 | 66.7 | 66.7 | 66.7 | 66.7 |
| DMF | Solvent | 13.3 | 13.3 | 13.3 | 13.3 | 13.3 | 13.3 |
| Water | Solvent | - | - | - | - | - | - |
| NMP | Solvent | - | - | - | - | - | - |
| GNP-MSTC | Nanoplatelets | - | - | - | - | - | - |
| XG Sciences - M5 | Nanoplatelets | 2.0 | 3.0 | 2.0 | 2.0 | - | - |
| XG Sciences - M25 | Nanoplatelets | 0.50 | 0.50 | 0.50 | 0.50 | - | - |
| Alamine 308 | Suspension agent | - | - | - | - | - | - |
| PVP | Suspension agent | - | - | - | - | - | - |
| Dow Corning Z-6040 | Coupling agent | 1.0 | 1.5 | 1.5 | 1.5 | 1.5 | 1.5 |
| Dow Corning Z-6011 | Coupling agent | 0.25 | 0.25 | 0.25 | 0.25 | 0.25 | 0.25 |
| Irgaguard F 3000 | Fungicide | 3.0 | 6.0 | 6.0 | 6.0 | 6.0 | 6.0 |
| Saytex 8010 | Br-flame retardant | - | 4.0 | 4.0 | 4.0 | 4.0 | 4.0 |
| TBEP | P-flame retardant | 2.5 | 2.0 | 2.0 | 2.0 | 2.0 | 2.0 |
| Sb$_2$O$_3$ | Sb-flame retardant | - | - | - | - | - | - |
| Stahl Permuthane SU21-591 | Resin | 100.0 | 100.0 | 100.0 | - | - | - |
| Stahl Permuthane SU26-260 | Resin | - | - | - | - | - | - |
| Stahl Permuthane SU21-760 | Resin | - | - | - | - | - | - |
| Bayer Impranil ELH | Resin | - | - | - | - | - | - |
| Bayer Impranil EWN-13 | Resin | 100.0 | 100.0 | 100.0 | 200.0 | 200.0 | 200.0 |
| Stahl Permuthane RU21-074 | Resin (WB) | - | - | - | - | - | - |
| Bayer Imprafix TH Solution | Crosslinker | - | - | - | - | - | 1.0 |

Fig. 8

| Heat Resistant Resins | E | F | G | H | I | SB | T | Z | ZZ | X | X-AL |
|---|---|---|---|---|---|---|---|---|---|---|---|
| Clifton Part A (waterborne) | 55.0 | 50.0 | 50.0 | 50.0 | 50.0 | | | | | | |
| Clifton Part B (waterborne) | 20.35 | 18.5 | 18.5 | 18.5 | 18.5 | | | | | | |
| Clifton Al paint (solventborne) | | | | | | 50.0 | 50.0 | | | 32.0 | 32.0 |
| Clifton Al slurry (solventborne) | | | | | | 50.0 | | | | | |
| Goodrich resin F | | | | | | | | 43.0 | 130.0 | | |
| Goodrich resin D | 5.0 | | | | | | | | | 130.0 | 130.0 |
| Hytech Ceramic Microspheres | | 2.5 | 3.0 | | | | | | | | |
| 3M W-210 Ceramic microspheres | | | | 3.0 | 3.0 | | 3.0 | 1.0 | 3.2 | 3.2 | 3.2 |
| Deionized H$_2$O | | | | | 3.0 | | | | | | |
| Toluene/DMF blend | | | | | | | | | | | 15.0 |

| Heat Resistant Resins | M | N | O | P | Q | Q2 | Q3 | Q4 | Q5 | Q6 | Q7 | Q8 | Q9 | Q10 |
|---|---|---|---|---|---|---|---|---|---|---|---|---|---|---|
| Goodrich resin D | 130.0 | 130.0 | 130.0 | 130.0 | 100.0 | | | | | | | | | |
| Goodrich resin D3 | | | | | | 40.0 | 30.0 | 30.0 | | | | | | |
| Goodrich resin M2 | | | | | | | | | 30.0 | 30.0 | 30.0 | | | |
| Goodrich resin D3 | | | | | | | | | | | | | | |
| Goodrich resin G2 | | | | | | | | | | | | | | |
| Goodrich resin D6 | | | | | | | | | | | | 30.0 | | |
| Goodrich resin N1 | | | | | | | | | | | | | 30.0 | |
| Goodrich resin M2 | | | | | | | | | | | | | | 30.0 |
| Stamford A1 | 12.0 | | | | | 20.0 | 30.0 | 25.0 | 25.0 | 22.5 | 22* | 22* | 22* | 22* |
| Etemabrite 301-1 | | 12.0 | | 12.0 | 18.0 | | | | | | | | | |
| Etemabrite Premier 351 | | | 12.0 | | | | | | | | | | | |
| 3M W-210 Ceramic microspheres | 3.0 | 3.0 | 3.0 | 3.0 | 2.0 | 1.0 | 1.0 | 1.0 | 1.0 | 1.0 | 1.0 | 1.0 | 1.0 | 1.0 |
| Dow Corning Z-6011 | | | | | | 0.1 | 0.1 | 0.1 | 0.1 | 0.1 | 0.25 | 0.25 | 0.25 | 0.25 |
| Bayer Impraflx TH Solution | | | | 1.0 | 1.0 | 0.1 | 0.1 | 0.1 | 0.1 | 0.1 | 0.1 | 0.1 | 0.1 | 0.1 |
| Toluene/DMF blend | AS NEEDED | | | | | 20.0 | 30.0 | 28.0 | 28.0 | 28.0 | 22.0 | 22.0 | 22.0 | 22.0 |

Fig. 9

| Sample | Cut Sample Size 2.5"x 6" | | | | Fabric (Count) | AR Layer 1 Resin 1 | AR Layer 2 Resin 2 | HR Layer 1 Resin 1 | AR Layer 1 Rod | HR Layer 1 Rod | Weight (g) |
|---|---|---|---|---|---|---|---|---|---|---|---|
| | Warp (lbs) | Elong (%) | Fill (lbs) | Elong (%) | | | | | | | |
| Coated 72 | 391 | 31.2% | 389 | 45.5% | 72x72 | | | | | | 0.151 |
| Base 72 | 376 | 34.5% | 326 | 42.6% | 72x72 | \multicolumn{5}{c}{Current manufactured fabric} | | 0.081 |
| 6 | 306 | 46.9% | 265 | 42.7% | 60x60 | | | | | | 0.083 |
| 6 UHT | 327 | 46.8% | 331 | 45.3% | 60x60 UHT | | | | | | |
| 4 | 171 | 63.2% | 201 | 59.3% | 46x46 | | | | | | |
| 3 | 95 | 53.1% | 49 | 54.2% | 36x36 | | | | | | |
| H1 | 228 | 33.7% | - | - | 46x46 | - | - | \multicolumn{3}{c}{Uncoated base cloths} | 0.110 |
| H2 | - | - | - | - | 36x36 | - | - | | | | 0.094 |
| H3 | 156 | 28.3% | 193 | 33.7% | 46x46 | - | - | | | | 0.085 |
| H4 | 479 | 43.7% | 451 | 33.7% | 72x72 | A | - | | | | - |
| H5 | 364 | 34.0% | 357 | 42.3% | 60x60 | A | B | 30 | 30 | - | - |
| H6 | 343 | 33.3% | 356 | 44.0% | 60x60 | A | B | 30 | 30 | - | - |
| H7 | 370 | 35.0% | - | 40.7% | 60x60 | A | B | 40 | 40 | - | - |
| H8 | 355 | 44.3% | 354 | 35.0% | 60x60 | C | D | 40 | 40 | - | - |
| H9 | 348 | 35.3% | 339 | 42.3% | 60x60 | C | D | 40 | 60 | - | - |
| H10 | 345 | 35.3% | 356 | 44.7% | 60x60 | C | D | 20 | 30 | - | - |
| H11 | 337 | 33.0% | 323 | 41.0% | 60x60 | C | D | 20 | 20 | - | - |
| H12 | 362 | 37.0% | 332 | 42.3% | 60x60 | C | D | 15 | 15 | - | - |
| H13 | 320 | 96.3% | 247 | 153.7% | Stretch | C | D | 15 | 20 | - | - |
| H14 | 259 | - | 256 | - | 46x46 | C | D | 20 | 20 | - | 0.195 |
| H15 | 273 | 40.0% | 248 | 44.3% | 46x46 | E | F | 20 | 20 | - | 0.115 |
| H16 | 278 | 39.3% | 257 | 46.7% | 46x46 | E | F | 30 | 30 | - | 0.112 |
| H17 | 254 | 37.7% | 208 | 43.7% | 46x46 | E | F | 20 | 40 | - | 0.105 |
| | | | | | 46x46 | E | F | 30 | 40 | - | 0.102 |

Fig. 10

| Sample | Warp (lbs) | Elong (%) | Fill (lbs) | Elong (%) | Fabric (Count) | AR Layer1 Resin 1 | AR Layer1 Rod | AR Layer 2 Resin 2 | AR Layer 2 Rod | HR Layer 1 Resin 1 | HR Layer 1 Rod | Weight (g) |
|---|---|---|---|---|---|---|---|---|---|---|---|---|
| H18 | 266 | 38.5% | 256 | 48.5% | 46x46 | J | 30 | F | 40 | - | - | 0.101 |
| H19 | 254 | 36.7% | 238 | 48.7% | 46x46 | E | 30 | F | 40 | - | - | 0.115 |
| H19 | 259 | 38.1% | - | - | 46x46 | E | 30 | H | 40 | - | - | - |
| H20 | 239 | 37.2% | 229 | 42.5% | 46x46 | J | 30 | H | 40 | - | - | 0.110 |
| H20 | 226 | 33.6% | 264 | 46.1% | 46x46 | J | 30 | H | 40 | - | - | - |
| H21 | 335 | 32.3% | 241 | 44.3% | 60x60 | J | 20 | F | 40 | - | - | 0.123 |
| H21 | 334 | 33.6% | - | - | 60x60 | J | 20 | F | 40 | - | - | - |
| H22 | 335 | 33.5% | 343 | 45.2% | 60x60 | H | 40 | E | 30 | - | - | 0.117 |
| H23 | 352 | 35.9% | 321 | 41.1% | 60x60 | J | 30 | F | 40 | - | - | 0.123 |
| H24 | 347 | 34.3% | 339 | 44.0% | 60x60 | J | 30 | H | 40 | - | - | 0.121 |
| H25 | 350 | 36.0% | 360 | 45.1% | 60x60 | E | 30 | H | 40 | - | - | 0.124 |
| H26 | 330 | 32.7% | 312 | 41.8% | 60x60 | L | 30 | K | 40 | - | - | 0.107 |
| H27 | 371 | 36.1% | 355 | 44.5% | 60x60 | E | 30 | H | 30 | - | - | 0.123 |
| H28 | 354 | 34.9% | 329 | 42.3% | 60x60 | L | 30 | K | 40 | - | - | 0.120 |
| H29 | 345 | 34.4% | 344 | 44.4% | 60x60 | J | 30 | H | 40 | - | - | 0.113 |
| H30 | 353 | 36.5% | 350 | 43.1% | 60x60 | M | 30 | K | 40 | - | - | 0.119 |
| H31 | 345 | 34.2% | 310 | 42.0% | 60x60 | J | 30 | K | 60 | - | - | 0.124 |
| H32 | 363 | 36.2% | 378 | 46.5% | 60x60 | L | 40 | K | 40 | - | - | 0.125 |
| H33 | 350 | 34.5% | 307 | 39.0% | 60x60 | J | 20 | H | 30 | - | - | 0.117 |
| H34 | 348 | 36.6% | 366 | 47.9% | 60x60 | L | 30 | - | - | - | - | 0.111 |
| H35 | 355 | 35.5% | 328 | 41.7% | 60x60 | L | 30 | - | - | - | - | 0.106 |
| H36 | 344 | 36.1% | 351 | 46.5% | 60x60 | L | 30 | - | - | - | - | 0.106 |
| H37 | 326 | 34.0% | 329 | 41.0% | 60x60 | N | 30 | K | 40 | - | - | 0.140 |
| H38 | 343 | 33.4% | 349 | 43.4% | 60x60 | O | 30 | O | 30 | - | - | 0.123 |
| H43 | 349 | 36.6% | 320 | 39.9% | 60x60 | Q | 30 | O | 30 | - | - | 0.121 |
| H44 | 338 | 35.3% | 347 | 43.7% | 60x60 | Q | 30 | P | 30 | - | - | 0.121 |

Fig. 11

| Sample | Warp (lbs) | Warp Elong (%) | Fill (lbs) | Fill Elong (%) | Fabric (Count) | AR Layer 1 Resin 1 | AR Layer 1 Rod | AR Layer 2 Resin 2 | AR Layer 2 Rod | HR Layer 1 Resin 1 | HR Layer 1 Rod | Weight (g) |
|---|---|---|---|---|---|---|---|---|---|---|---|---|
| H45 | 351 | 35.8% | 351 | 44.7% | 60x60 | S | 40 | O | 30 | - | - | 0.115 |
| H46 | 346 | 36.8% | 350 | 45.5% | 60x60 | S | 30 | O | 30 | - | - | 0.115 |
| H47 | 362 | 35.7% | 345 | 44.1% | 60x60 | T | 20 | O | 40 | - | - | 0.124 |
| H48 | 323 | 34.0% | 361 | 48.0% | 60x60 | T | 30 | O | 30 | - | - | 0.125 |
| H49 | 362 | 37.3% | 317 | 41.9% | 60x60 | T | 30 | O | 40 | - | - | 0.126 |
| H50 | 350 | 34.7% | 341 | 42.1% | 60x60 | T | 30 | U | 40 | - | - | 0.121 |
| H51 | 362 | 35.2% | 357 | 44.2% | 60x60 | T | 30 | V | 30 | - | - | 0.125 |
| H52 | 342 | 33.3% | 339 | 43.3% | 60x60 | T | 20 | V | 40 | - | - | 0.125 |
| H53 | 349 | 34.4% | 358 | 45.4% | 60x60 | T | 30 | U | 40 | - | - | 0.121 |
| H54 | 338 | 35.6% | 355 | 45.7% | 60x60 | T | 30 | U | 20 | - | - | 0.115 |
| H62 | 360 | 35.1% | 367 | 46.0% | 60x60 | Y | 20 | AB | 30 | - | - | 0.132 |
| H64 | 343 | 35.1% | 364 | 45.2% | 60x60 | AA | 20 | AB | 30 | - | - | 0.106 |
| H65 | 320 | 32.7% | 351 | 45.0% | 60x60 | AA | 30 | Z | 30 | - | - | 0.107 |
| H68 | 333 | 32.4% | 328 | 40.9% | 60x60 | AC | 20 | AD | 30 | - | - | 0.109 |
| H69 | 343 | 33.7% | 360 | 44.6% | 60x60 | AC | 30 | AD | 30 | - | - | 0.116 |
| H115 | 356 | 41.9% | 385 | 56.7% | 60x60 | C2A | 15 | B2C | 20 | - | - | 0.127 |
| H116 | 366 | 38.5% | 382 | 55.7% | 60x60 | C2A | 15 | B2C | 20 | - | - | 0.134 |
| H117 | 370 | 35.0% | 366 | 51.6% | 60x60 | C2A | 15 | B2C | 20 | - | - | 0.138 |
| H118 | 367 | 33.4% | 407 | 52.1% | 60x60 | C2A | 15 | B2C | 20 | - | - | 0.138 |
| H122 | 400 | 33.9 | 360 | 53.6 | 60x60 | C2A | 15 | B2C | 20 | - | - | 0.131 |
| H127 | 382 | 45.3 | 389 | 53.3 | 60x60 | C2A | 15 | B2AD | 15 | - | - | 0.144 |
| H131 | 376 | 39.7 | 386 | 55.6 | 60x60 | C2A | 15 | B2C | 15 | - | - | 0.131 |
| H132 | 382 | 37.9 | 396 | 52.1 | 60x60 | C2A | 15 | B2C | 15 | - | - | 0.123 |
| H134 | 329 | 36.4 | 335 | 52.5 | 60x60 | C2B | 15 | B2AD | 15 | - | - | 0.143 |
| H135 | 389 | 39.3 | 363 | 58.0 | 60x60 | C2B | 15 | B2AD | 15 | - | - | 0.129 |

Fig. 12

| Sample | Warp Elong (lbs) | Warp Elong (%) | Fill (lbs) | Fill Elong (%) | Fabric (Count) | AR Layer 1 Resin 1 | AR Layer 1 Rod | AR Layer 2 Resin 2 | AR Layer 2 Rod | HR Layer 1 Resin 1 | HR Layer 1 Rod | Weight (g) |
|---|---|---|---|---|---|---|---|---|---|---|---|---|
| H135 | 363 | 29.9 | 396 | 54.2 | 60x60 | C2B | 15 | B2AD | 15 | - | - | 0.179 |
| H139 | 397 | 44.0 | 349 | 50.3 | 60x60 | C2B | 15 | B2AD | 15 | - | - | 0.120 |
| H140 | 375 | 32.6 | 379 | 53.9 | 60x60 | C2B | 15 | B2AD | 15 | - | - | 0.115 |
| H144 | 378 | 32.4 | 401 | 54.2 | 60x60 | C2B | 15 | B2AD | 15 | - | - | 0.112 |
| H254 | 373 | 32.8 | 352 | 49.5 | 60x60 UHT | D | 30 | - | - | Al-X | 15 | 0.092 |
| H256 | 369 | 24.6 | 349 | 23.2 | 60x60 UHT | D2 | 30 | - | - | Al-X | 15 | 0.092 |
| H260 | 256 | 26.6 | 307 | 56.4 | 55x55 UHT | D2 | 30 | - | - | Al-X | 15 | 0.082 |
| H262 | 324 | 29.5 | 268 | 44.5 | 55x55 UHT-Cal | D | 30 | - | - | Al-X | 15 | 0.086 |
| H267 | 301 | 33.0 | 341 | 54.2 | 55x55 UHT-Cal | D2 | 30 | - | - | Al-X | 15 | 0.091 |
| H269 | 278 | 31.4 | 356 | 54.9 | 55x55 UHT-Cal | D2 | 30 | - | - | Al-X | 15 | 0.088 |
| H271 | 297 | 33.2 | 386 | 49.2 | 60x60 UHT | D | 30 | - | - | Al-X | 15 | 0.113 |
| H276 | 412 | 34.0 | 405 | 50.8 | 60x60 UHT | D2 | 30 | - | - | Al-X | 15 | 0.137 |
| H270 | 368 | 32.6 | 361 | 53.9 | 55x55 UHT | D | 40 | - | - | Al-X | 15 | 0.106 |
| H280 | 346 | 32.9 | 352 | 48.5 | 55x55 UHT | D2 | 40 | - | - | Al-X | 15 | 0.109 |
| H284 | 310 | 33.0 | 346 | 59.5 | 55x55 UHT-Cal | D | 40 | - | - | Al-X | 15 | 0.097 |
| H286 | 333 | 34.9 | 316 | 54.9 | 55x55 UHT-Cal | D2 | 40 | - | - | Al-X | 15 | 0.101 |
| H290 | 298 | 30.7 | 319 | 46.6 | 55x55 UHT | C3 | 50 | - | - | P | 30 | 0.103 |
| H291 | 316 | 29.3 | 306 | 45.0 | 55x55 UHT | D | 50 | - | - | P | 30 | 0.107 |
| H293 | 323 | 27.2 | 359 | 49.7 | 55x55 UHT | D2 | 50 | - | - | P | 30 | 0.094 |
| H295 | 337 | 31.1 | 372 | 48.4 | 55x55 UHT | C3 | 30 | C3 | 20 | P | 30 | 0.101 |
| H298 | 304 | 30.1 | 360 | 47.2 | 55x55 UHT | D2 | 30 | D | 20 | P | 30 | 0.110 |
| H299 | 303 | 30.9 | 369 | 46.2 | 55x55 UHT | D | 20 | D2 | 20 | P | 30 | 0.112 |
| H301 | 314 | 28.7 | 360 | 45.9 | 55x55 UHT | C3 | 20 | C3 | 30 | Q | 20 | 0.104 |
| H304 | 296 | 31.1 | 359 | 46.5 | 55x55 UHT | D | 20 | D | 30 | Q | 20 | 0.114 |
| H305 | 329 | 36.3 | 366 | 47.4 | 55x55 UHT | D2 | 20 | D2 | 30 | Q | 20 | 0.134 |

Fig. 13

| Sample | Warp (lbs) | Warp Elong. (%) | Fill (lbs) | Fill Elong. (%) | Fabric (Count) | AR Layer 1 Resin 1 | AR Layer 1 Rod | AR Layer 2 Resin 2 | AR Layer 2 Rod | HR Layer 1 Resin 1 | HR Layer 1 Rod | Weight (g) |
|---|---|---|---|---|---|---|---|---|---|---|---|---|
| H308 | 322 | 29.4 | 52 | 46.4 | 55x55 UHT | C3 | 30 | C3 | 20 | Q | 20 | 0.106 |
| H310 | 364 | 31.6 | 350 | 46.2 | 55x55 UHT | D | 30 | D | 20 | Q | 20 | 0.117 |
| H312 | 339 | 29.7 | 352 | 48.1 | 55x55 UHT | D2 | 30 | D2 | 20 | Q | 20 | 0.107 |
| H314 | 381 | 33.5 | 76 | 51.3 | 60x60 UHT | C3 | 20 | C3 | 20 | Q | 20 | 0.108 |
| H316 | 380 | 33.2 | 389 | 50 | 60x60 UHT | D | 20 | D | 20 | Q | 20 | 0.110 |
| H317 | 48 | 34.7 | 428 | 51.1 | 60x60 UHT | D2 | 20 | D2 | 20 | Q | 20 | 0.113 |
| H319 | 55 | 34.8 | 109 | 58.3 | 60x60 UHT | D2 | 20 | C3 | 20 | Q | 20 | 0.115 |
| H321 | 390 | 33.1 | 57 | 49.8 | 60x60 UHT | D | 20 | D | 20 | Q2 | 20 | 0.113 |
| H324 | 374 | 32.1 | 320 | 53.9 | 60x60 UHT | D2 | 20 | D2 | 20 | Q2 | 20 | 0.123 |
| H355 | 280 | 34.1 | 403 | 54.4 | 60x60 UHT | G2 | 20 | - | - | Q4 | 20 | 0.110 |
| H357 | 362 | 34.1 | 379 | 49.5 | 60x60 UHT | G2 | 30 | - | - | Q4 | 20 | 0.122 |
| H360 | 390 | 35.9 | 399 | 51.5 | 60x60 UHT | G2 | 40 | - | - | Q5 | 20 | 0.110 |
| H362 | 400 | 36.1 | 412 | 50.9 | 60x60 UHT | G2 | 20 | - | - | Q5 | 20 | 0.112 |
| H364 | 312 | 35.5 | 388 | 49.5 | 60x60 UHT | G2 | 30 | - | - | Q6 | 20 | 0.114 |
| H366 | 384 | 34.4 | 405 | 51 | 60x60 UHT | G2 | 40 | - | - | Q6 | 20 | 0.109 |
| H368 | 398 | 33.4 | 115 | 66.1 | 60x60 UHT | G2 | 20 | - | - | Q6 | 20 | 0.117 |
| H369 | 303 | 35.8 | 299 | 49 | 60x60 UHT | G2 | 30 | - | - | Q6 | 20 | 0.124 |
| H371 | 282 | 36.5 | 411 | 49.4 | 60x60 UHT | G2 | 40 | - | - | Q6 | 20 | 0.129 |
| H374 | 283 | 36.5 | 409 | 54.7 | 60x60 UHT | D3 | 20 | - | - | Q6 | 20 | 0.115 |
| H376 | 318 | 38 | 400 | 50.7 | 60x60 UHT | D3 | 30 | - | - | Q6 | 20 | 0.118 |
| H378 | 411 | 37.8 | 409 | 52.9 | 60x60 UHT | D3 | 40 | - | - | Q6 | 20 | 0.115 |
| H380 | 354 | 36.4 | 419 | 49.2 | 60x60 UHT | G3 | 20 | - | - | Q7 | 20 | 0.119 |
| H382 | 413 | 33.6 | 117 | 61.68 | 60x60 UHT | G3 | 30 | - | - | Q7 | 20 | 0.113 |
| H384 | 386 | 34.6 | 376 | 51.3 | 60x60 UHT | G3 | 40 | - | - | Q7 | 20 | 0.118 |
| H385 | 77 | 31.4 | 349 | 46.8 | 55x55 UHT | G3 | 20 | - | - | Q7 | 20 | 0.110 |

Fig. 14

| Sample | Warp (lbs) | Elong. (%) | Fill (lbs) | Elong (%) | Fabric (Count) | AR Layer 1 Resin 1 | AR Layer 1 Rod | AR Layer 2 Resin 2 | AR Layer 2 Rod | HR Layer 1 Resin 1 | HR Layer 1 Rod | Weight (g) |
|---|---|---|---|---|---|---|---|---|---|---|---|---|
| H388 | 312 | 29.2 | 355 | 47.3 | 55x55 UHT | G3 | 30 | - | - | Q7 | 20 | 0.114 |
| H390 | 239 | 32.8 | 379 | 47.1 | 55x55 UHT | G3 | 40 | - | - | Q7 | 20 | 0.124 |
| H391 | 329 | 36.6 | 392 | 50.2 | 60x60 UHT | H1 | 20 | - | - | Q7 | 20 | 0.105 |
| H394 | 400 | 35.2 | 327 | 50.2 | 60x60 UHT | H1 | 30 | - | - | Q7 | 20 | 0.107 |
| H396 | 363 | 34.7 | 321 | 53.5 | 60x60 UHT | H1 | 40 | - | - | Q7 | 20 | 0.118 |
| H398 | 214 | 38.5 | 356 | 47.8 | 55x55 UHT | H1 | 20 | - | - | Q7 | 20 | 0.101 |
| H399 | 190 | 29.6 | 356 | 47.8 | 55x55 UHT | H1 | 30 | - | - | Q7 | 20 | 0.111 |
| H402 | 375 | 31.8 | 336 | 45.1 | 55x55 UHT | H1 | 40 | - | - | Q7 | 20 | 0.108 |
| H404 | 359 | 36.6 | 107 | 57.9 | 60x60 UHT | H2 | 20 | - | - | Q7 | 20 | 0.099 |
| H405 | 377 | 32.5 | 396 | 51.3 | 60x60 UHT | H2 | 30 | - | - | Q7 | 20 | 0.105 |
| H408 | 407 | 51.4 | 247 | 31.7 | 60x60 UHT | H2 | 40 | - | - | Q7 | 20 | 0.106 |
| H410 | 247 | 31.7 | 375 | 50.9 | 55x55 UHT | H2 | 20 | - | - | Q7 | 20 | 0.093 |
| H412 | 288 | 33.9 | 266 | 50.8 | 55x55 UHT | H2 | 30 | - | - | Q7 | 20 | 0.099 |
| H414 | 269 | 32.3 | 288 | 48.7 | 55x55 UHT | H2 | 40 | - | - | Q7 | 20 | 0.096 |
| H415 | 300 | 34.6 | 400 | 51.1 | 60x60 UHT | D2A | 20 | - | - | Q7 | 20 | 0.100 |
| H418 | 337 | 37.1 | 416 | 52.8 | 60x60 UHT | D2A | 30 | - | - | Q7 | 20 | 0.105 |
| H420 | 247 | 34.7 | 416 | 53.1 | 60x60 UHT | D2A | 40 | - | - | Q7 | 20 | 0.109 |
| H421 | 383 | 34.8 | 407 | 51.3 | 60x60 UHT | J1 | 20 | - | - | Q7 | 20 | 0.099 |
| H424 | 371 | 37.4 | 372 | 50.4 | 60x60 UHT | J1 | 30 | - | - | Q7 | 20 | 0.103 |
| H425 | 380 | 34.2 | 382 | 47.4 | 60x60 UHT | J1 | 40 | - | - | Q7 | 20 | 0.109 |
| H464 | 380 | 37.5 | 392 | 51.3 | 60x60 UHT | D | 20 | - | - | Q7 | 20 | 0.112 |
| H466 | 390 | 36.0 | 347 | 50.7 | 60x60 UHT | D | 30 | - | - | Q7 | 20 | 0.104 |
| H468 | 275 | 36.8 | 394 | 52.7 | 60x60 UHT | D | 40 | - | - | Q7 | 20 | 0.107 |
| H470 | 388 | 35.3 | 379 | 54.1 | 60x60 UHT | D4 | 20 | - | - | Q7 | 20 | 0.103 |
| H471 | 256 | 34.5 | 387 | 50.2 | 60x60 UHT | D4 | 30 | - | - | Q7 | 20 | 0.107 |

Fig. 15

| Sample | Warp (lbs) | Elong. (%) | Fill (lbs) | Elong. (%) | Fabric (Count) | AR Layer 1 Resin 1 | AR Layer 1 Rod | AR Layer 2 Resin 2 | AR Layer 2 Rod | HR Layer 1 Resin 1 | HR Layer 1 Rod | Weight (g) |
|---|---|---|---|---|---|---|---|---|---|---|---|---|
| H473 | 409 | 34.7 | 406 | 54.2 | 60x60 UHT | D4 | 40 | - | - | Q7 | 20 | 0.111 |
| H476 | 329 | 36.5 | 380 | 57.0 | 60x60 UHT | M1 | 20 | - | - | Q8 | 20 | 0.100 |
| H478 | 354 | 36.0 | 404 | 54.8 | 60x60 UHT | M1 | 30 | - | - | Q8 | 20 | 0.110 |
| H480 | 272 | 36.9 | 387 | 51.1 | 60x60 UHT | M1 | 40 | - | - | Q8 | 20 | 0.121 |
| H481 | 385 | 36.0 | 381 | 54.4 | 60x60 UHT | M2 | 20 | - | - | Q8 | 20 | 0.106 |
| H484 | 382 | 36.8 | 390 | 54.1 | 60x60 UHT | M2 | 30 | - | - | Q8 | 20 | 0.114 |
| H486 | 391 | 33.0 | 410 | 54.1 | 60x60 UHT | M2 | 40 | - | - | Q8 | 20 | 0.114 |

HIGH-STRENGTH LIGHTWEIGHT FABRIC FOR INFLATABLE STRUCTURES

This application claims priority of U.S. Provisional Patent Application 61/494,759 filed on Jun. 8, 2011.

BACKGROUND OF THE INVENTION

This invention relates to emergency evacuation equipment for aircraft, in particular, to inflatable aircraft evacuation slides, life rafts, as well as other inflatable structures.

The requirement for reliably evacuating airline passengers in the event of an emergency is well known. Emergencies at take-off and landing often demand swift removal of the passengers from the aircraft because of the potential for injuries from fire, explosion, or sinking in water. A conventional method of quickly evacuating a large number of passengers from an aircraft is to provide multiple emergency exits, each of which is equipped with an inflatable evacuation slide, which often doubles as a life raft in the event of a water evacuation. These evacuation slides are most commonly constructed of an air-impervious coated fabric material that is formed into a plurality of tubular members. When inflated, these tubular members form a self-supporting structure with a slide surface capable of supporting the passengers being evacuated. In addition to being air-impervious, the fabric material from which the tubular members are constructed must meet FAA specification requirements of TSO-C69c for resistance to radiant heat, flammability, contaminants, fungus and other requirements.

Although evacuation slides permit passengers to quickly and safely descend from the level of the aircraft exit door to the ground, the requirement that each and every aircraft exit door be equipped with an inflatable evacuation slide means that commercial aircraft must devote substantial payload capacity to the carrying of multiple evacuation slides. Accordingly, there has long existed the desire in the industry to make the inflatable evacuation slides as light as possible. A significant portion of the weight of an emergency evacuation slide is the weight of the slide fabric itself. Accordingly, various attempts have been made to reduce the weight of the slide fabric. One accepted method has been to reduce the physical size of the structural members of the slide by increasing the inflation pressure. Increased inflation pressure, however, causes greater stress on the slide fabric and, therefore, the benefit of the reduced physical size is at least partially cancelled out by the need to use a heavier gauge of slide fabric. Current state of the art slide fabric consists of a 72×72 yarns per inch nylon cloth made of ultra-high-tenacity nylon fibers. This 72×72 base cloth has a grab tensile strength of approximately 376 lbs in the warp direction and 326 lbs in the fill direction (as used herein grab tensile strength refers to the strength measured by grabbing a sample of fabric, typically 4 inches wide, between a set of one inch wide jaws and pulling to failure.) The base cloth is covered with multiple layers of an elastomeric polyurethane coating on one side and a radiant-heat resistant aluminum/thermoplastic polyurethane (TPU) layer on the other. This results in a strong, but heavy fabric, having a grab tensile strength of approximately 391 lbs in the warp direction and 389 lbs in the fill direction, but an areal weight of 7.0 oz/yd$^2$ or more. As can be determined from the foregoing, the coatings do not contribute significantly to the strength of the fabric.

SUMMARY OF THE INVENTION

The present invention comprises a high-strength, lightweight inflatable structure such as aircraft emergency evacuation slide, life raft or other inflatable structure. According to an illustrative embodiment, the structure is formed of at least one flexible fabric member that, in an inflated condition, forms a self-supporting structure. The flexible fabric member is formed from a bare fabric having an areal weight of less than 4.5 oz/yd$^2$. The fabric is coated with air-impervious resin coating comprising a polyurethane resin having at least 0.01% by weight graphene nanoplatelets and at least 0.05% by weight of a phosphorus-based flame retardant added thereto. Although not wishing to be held to any particular theory of operation, it is believed that thermal exfoliation of graphene nanoplatelets yields graphene nanoplatelets with residual graphene oxide. Graphene oxide, which is a polar molecule, has an affinity for the polar molecules that make up the phosphorus based flame retardant. Accordingly, in addition to its inherent flame-retardant properties, the phosphorus based flame retardant acts as a dispersant to improve the uniform dispersion of the graphene nanoplatelets within the matrix, thus reducing or eliminating the need to use additional dispersants. This also reduces or eliminates the need to fully reduce the graphene nanoplatelets to compatibilize them with the organic polymer matrix. The addition of fully-dispersed graphene nanoplatelets to the organic polymer matrix yields gas barrier and tensile properties not heretofore seen in slide fabrics of comparable weight.

BRIEF DESCRIPTION OF THE DRAWING

The present invention will be better understood from a reading of the following detailed description, taken in conjunction with the accompanying drawing figures in which like references designate like elements and, in which:

FIGS. 4-8 are a table of formulations for the air-impervious coating applied to the base fabric shown in FIG. 3;

FIG. 9 is a table of formulations for the heat resistant coating applied to the base fabric shown in FIG. 3; and FIGS. 10-16 are a table showing the grab tensile strength and areal weight of various formulations of the slide fabric shown in FIG. 3.

DETAILED DESCRIPTION

Figure 1:
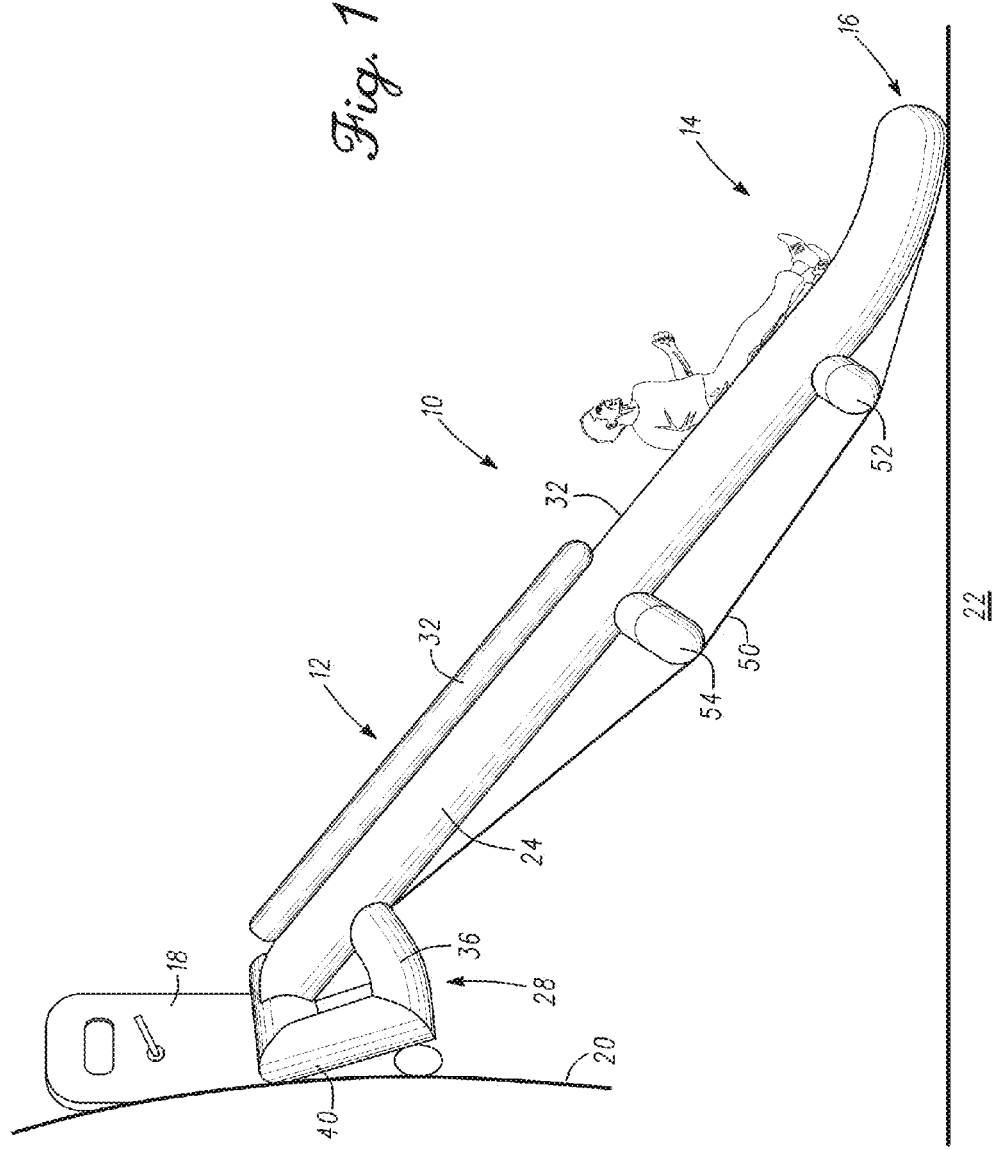
FIG. 1 is a side view of an aircraft evacuation slide incorporating features of the present invention.

The drawing figures are intended to illustrate the general manner of construction and are not necessarily to scale. In the detailed description and in the drawing figures, specific illustrative examples are shown and herein described in detail. It should be understood, however, that the drawing figures and detailed description are not intended to limit the invention to the particular form disclosed, but are merely illustrative and intended to teach one of ordinary skill how to make and/or use the invention claimed herein and for setting forth the best mode for carrying out the invention.

FIG. 1 shows an inflatable evacuation slide assembly 10 incorporating features of the present invention. Evacuation slide assembly 10 generally comprises a head end 12, and a foot end 14 terminating at toe end 16. Head end 12 is configured to couple evacuation slide assembly 12 to an exit door 18 of an aircraft 20 while foot end 14 is in contact with the ground 22 such that the slide assembly 10 provides a sloping surface to permit the rapid egress of passengers from aircraft 20.

Figure 2:
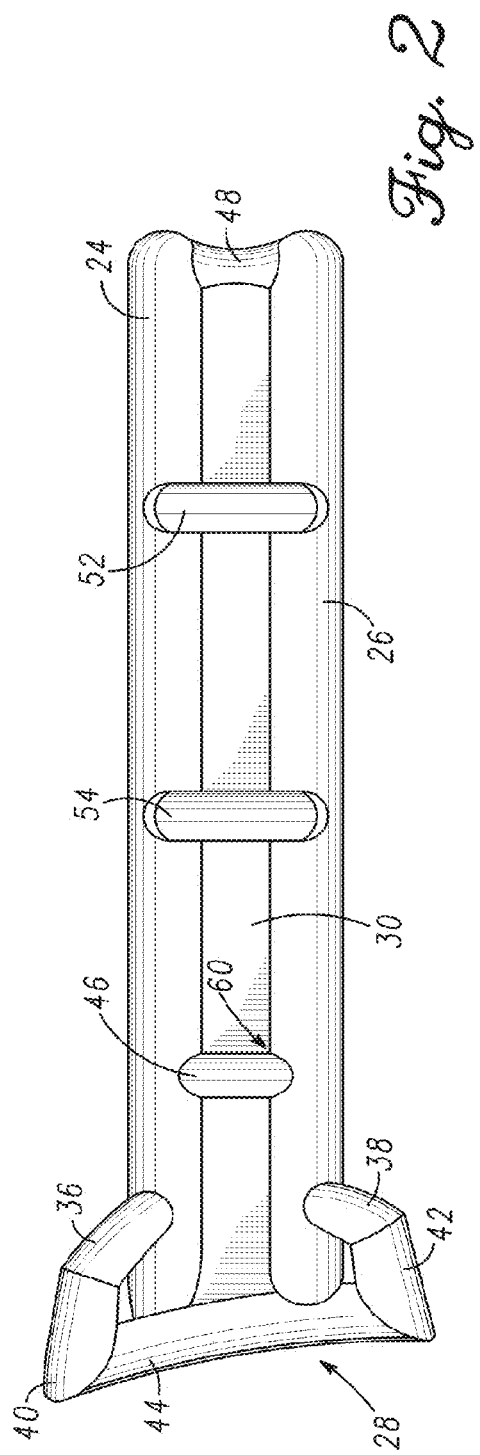
FIG. 2 is a bottom view of an aircraft evacuation slide incorporating features of the present invention.

With reference to FIGS. 1 and 2, the main body of evacuation slide assembly 10 comprises a plurality of inflatable flexible members including side rail tubes 24, 26 which extend from head end truss assembly 28 to the ground 22. A slide surface 30 comprising a fabric membrane is stretched between side rail tubes 24 and 26 to provide a sliding surface for the disembarking passengers. A right hand rail 32 and a left hand rail (not shown) are positioned atop side rail tubes 24 and 26, respectively, to provide a hand hold for passengers descending evacuation slide assembly 10. Head end truss assembly 28 comprises a plurality of strut tubes 36, 38, upright tubes 40, 42 and a transverse tube 44 adapted to hold head end 12 of evacuation slide assembly 10 against the fuselage of aircraft 20 in an orientation to permit escape slide assembly 10 to unfurl in a controlled manner as it extends toward the ground.

The spaced apart configuration of side rail tubes 24 and 26 is maintained by a head end transverse tube 46, a toe end transverse tube 48, a foot end transverse truss 52 and medial transverse truss 54. The bending strength of escape slide assembly 10 is enhanced by means of one or more tension straps 50 stretched from toe end 16 over foot end transverse truss 52, medial transverse truss 54 and attached proximal head end 12 of evacuation slide assembly 10. As described, evacuation slide assembly 10 provides a lightweight structure that consumes a minimum amount of inflation gas while providing the necessary structural rigidity to permit passengers to safely evacuate an aircraft under emergency conditions.

The entire inflatable evacuation slide assembly 10 is preferably fabricated from an air impervious material described more fully hereinafter. The various parts of the inflatable evacuation slide assembly 10 may be joined together with a suitable adhesive whereby the structure will form a unitary composite structure capable of maintaining its shape during operation. The entire structure of the inflatable evacuation slide assembly 10 is preferably formed such that all of the chambers comprising the structure are interconnected pneumatically, such that a single pressurized gas source, such as compressed carbon dioxide, nitrogen, argon, a pyrotechnic gas generator or combination thereof may be utilized for its deployment.

Figure 3:
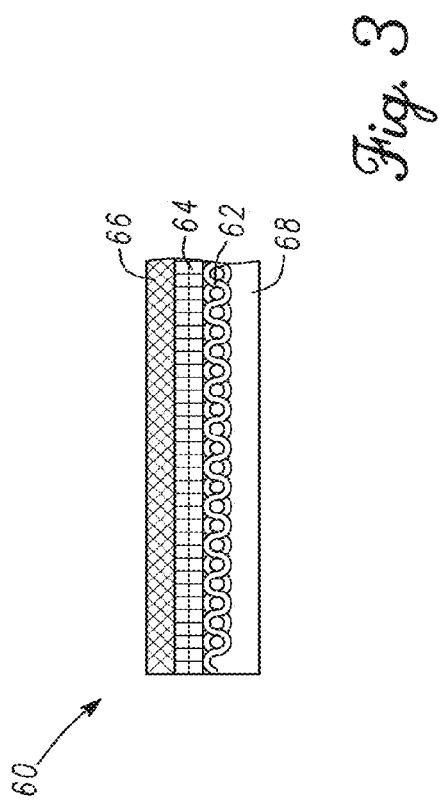
FIG. 3 is; a cross sectional view of the slide fabric used in the aircraft evacuation slide of FIG. 1.

FIG. 3 shows a cross section of an illustrative evacuation slide fabric 60. In the illustrative embodiment, fabric 60 comprises a base cloth 62 of ultra-high-tenacity nylon base cloth having 60×60 yarns per inch and an areal weight of approximately 3.79 oz/yd$^2$. A low modulus Air Retention (AR) tie coat 64 and optionally a higher modulus AR topcoat 66 are applied to one side of the base cloth 62. A difference between the AR tie-coat and AR topcoat is the tie coat uses a flexible organic resin, such as polycarbonate polyurethane which has a relatively low modulus of elasticity and therefore conforms better to the cloth morphology. The topcoat uses a relatively higher strength and modulus resin. A Heat Resistant (HR) resin layer 68 is then applied to the base cloth 62 on the side opposite the AR coatings.

In an illustrative embodiment (designated H362 in FIGS. 10-16) the AR tie coat 64 consists of a layer of resin applied to the base fabric of 60 ×60 ultra-high-tenacity nylon. The resin itself (designated G2 in FIGS. 4-8) comprises 66.6 grams of toluene, 13.3 grams of Dimethylformamide (DMF), 2 grams of M25 graphene nanoplatelets, from XG Sciences of Lansing MI, and 0.5 grams of Alamine 308 (triisooctylamine)-benzene, which are mixed together in an ultrasonic mixing apparatus for 3 hours. After this, 1.0 gram of Dow Corning Z6011 (3-Aminopropyltriethoxysilane) a coupling agent, 0.25 grams of Irgaguard F3000 (-2-Thiazol -4-yl-1 H-benzoimidazole) a fungicide, 6.0 grams of Saytex 8010- Ethane 1,2-bis (pentabromophenyl) a brominated flame retardant, and 6.0 grams of TBEP - Tris(2butoxy)ethylphosphate a phosphorus-based flame retardant are added. The mixture is agitated anadditional one hour in the ultrasonic mixing apparatus. Finally, 100 grams of Stahl Permuthane SU21591 a polycarbonate polyurethane resin and 100 grams of Bayer Impranil ELH also a polycarbonate polyurethane resin together with 2.0 grams of Bayer Imprafix TH Solution an aromatic polyisocyanate are then added and the mixture agitated a further 3 hours in the ultrasonic mixing apparatus, after which the resin is applied in a coating approximately 20 mils (0.020) thick to the base cloth. The illustrative resin G2 has approximately 0.67% by weight nanoplatelets having a particle size of 25 microns in diameter and approximately 2.0% by weight phosphorus-based flame retardant, however, the preferred resins contain at least 0.04% by weight nanoplatelets having a particle size of at least 5 microns in diameter and at least 0.05% by weight phosphorus-based flame retardant, preferably at least 0.40% by weight nanoplatelets and at least 0.50% by weight phosphorus-based flame retardant. (Since the nanoplatelets are not perfectly circular, as used herein, "diameter" refers to the mean diagonal of the nanoplatelet disk.) An exemplary formulation is between 0.4% and 1.7% by weight nanoplatelets. A further exemplary formulation is between 0.5% and 3.0% by weight phosphorus-based flame retardant. In the illustrative embodiment, the optional AR topcoat is omitted.

The Heat Resistant resin layer 68 consists of a layer of resin applied to the base fabric of 60 ×60 ultra-high-tenacity nylon on the side opposite the AR tie coat. In the example, the resin itself (designated Q5 in FIG. 9) consists of 28 grams of a mixture of 83% toluene and 17% Dimethylformamide (DMF), to which is added approximately 25 grams of Eternabrite® 301-1, a leafing aluminum pigment paste, manufactured by Silberline Manufacturing Co. of Tamaqua, PA and 1 gram of W-210 Ceramic microspheres, which are ceramic microspheres having an average particle size of 0.3-12 microns, manufactured by the 3 M Company of St. Paul, MN. The aluminum pigment and ceramic microspheres are suspended in the solvent blend and placed in an ultrasonic bath for a minimum of 0.5 hours. Alternately the fillers can be dispersed using a high-shear mixer. Finally, 30 grams of the AR tie coat resin M2 (Designated Goodrich resin M2 in FIGS. 9), and 0.1 gram of Bayer Imprafix TH Solution an aromatic polyisocyanate are added and the mixture agitated for a minimum of 60 minutes, after which the resin is applied in a coating approximately 20 mils (0.020) thick. The illustrative resin Q5has approximately 1.2% by weight W-210 microspheres however; the preferred HR resins contain at least .11% by weight microspheres. An exemplary formulation contains between .11% and 6.2% by weight microspheres. A further exemplary formulation contains between 1.1% and 2.1% by weight microspheres. As can be seen from an examination of FIG.9, several of the AR resins shown in FIGS. 4-8 are actually used as constituents of the HR layers, including AR resin M2 being used as a constituent of HR resin Q5.

As can be seen from the data recorded, the addition of the 20 mil AR resin coating having approximately 0.67% by weight 25 micron nanoplatelets and approximately 2.0% by weight phosphorus flame retardant, together with the 20 mil HR resin coating having approximately 1.2% by weight W-210 microspheres, produces a fabric having a grab tensile strength of at least 400 lbs/in but an areal weight of only 5.1 oz/yd$^2$. This is a weight savings of over 25% over the 7.0 oz/yd$^2$ prior art slide fabric. It was observed that a 4 inch wide sample was not significantly stronger than a 2½ inch wide sample in the grab tensile test. Accordingly, the data reported in FIGS. 10-16 is for 2½ inch wide samples.

Other exemplary formulations are shown in FIGS. 4-16 in which the following constituents are used:
- Toluene
- DMF—Dimethylformamide
- Water
- NMP N-Methyl Pyrrolidone
- GNP-MSTC (Graphene Nanoplatelets exfoliated by Goodrich Corp.)
- XG Sciences M5 5 micron nanoplatelets manufactured by XG Sciences, Lansing Mich.
- XG Sciences M25 25 micron nanoplatelets manufactured by XG Sciences, Lansing Mich.
- Alamine 308 (triisooctylamine)-benzene
- Dow Corning Z6040—3-Glycidoxypropyltrimethoxysilane manufactured by Dow Corning, Midland Mich.
- Dow Corning Z6011—3-Aminopropyltriethoxysilane manufactured by Dow Corning, Midland Mich.
- Irgaguard F3000-2-Thiazol-4-yl-1H-benzoimidazole
- Saytex 8010—Ethane-1,2-bis(pentabromophenyl)
- TBEP—Tris(2-butoxy)ethylphosphate
- $Sb_2O_3$
- Stahl Permuthane SU21591—Polycarbonate polyurethane resin
- Stahl Permuthane SU26260—Polycarbonate polyurethane resin
- Stahl Permuthane SU21760—Polycarbonate polyurethane resin
- Stahl Permuthane RU21074—Polycarbonate polyurethane resin
- Stahl XR40-102 isocyanate crosslinker
- Stahl XR9116 melamine crosslinker
- Stahl XR2500 aziridine crosslinker all manufactured by Stahl Holdings BV, Waalwijk, The Netherlands.
- Bayer Impranil ELH—Polycarbonate polyurethane resin
- Bayer Impranil EWN13—Polycarbonate polyurethane resin
- Bayer Imprafix TH Solution—Aromatic polyisocyanate all manufactured by Bayer AG Leverkusen, Germany
- Eternabrite® 301-1—leafing aluminum pigment paste
- Eternabrite® Premier 351—leafing aluminum pigment paste, both manufactured by Silberline Manufacturing Co. of Tamaqua, Pa.
- Stamford A1—aluminum filler also manufactured by Silberline Manufacturing Co. of Tamaqua, Pa.

The fiber strength of the base cloth can also be increased by incorporating nanoreinforcements into the polymeric matrix of the fiber itself. The nanoreinforcements can be carbon nanotubes, carbon nanofibers, grapheme nanoplatelets, polymeric nanofibers, metallic nanotubes or nanofibers, metal oxide nanotubes, metal oxide nanofibers, metal oxide nanoparticles or metal oxide nanoplatelets or a combination thereof. The nanoreinforcements can be incorporated into the polymer matrix of the fiber during synthesis of the fiber matrix or processing of the matrix into fibers. For example, the nanoreinforcements can be combined with the neat polymer matrix prior to thermal processing into fibers. The nanoreinforcements can also be incorporated into the monomeric precursors used to synthesize the polymeric composition of the cloth fiber.

Although certain illustrative embodiments and methods have been disclosed herein, it will be apparent from the foregoing disclosure to those skilled in the art that variations and modifications of such embodiments and methods may be made without departing from the invention. For example although the illustrative embodiment comprises an aircraft evacuation slide, other inflatable structures such as life rafts, emergency shelters and the like are considered within the scope of the invention. Accordingly, it is intended that the invention should be limited only to the extent required by the appended claims and the rules and principles of applicable law.

Additionally, as used herein, references to direction such as "up" or "down" are intend to be exemplary and are not considered as limiting the invention and, unless otherwise specifically defined, the terms "substantially" or "approximately" when used with mathematical concepts or measurements mean within ±10 degrees of angle or within 10 percent of the measurement, whichever is greater.

What is claimed is:

1. A lightweight inflatable structure comprising:
an air-impervious flexible fabric member which, in an inflated condition, forms a self-supporting structure, the flexible fabric member being formed from a resin-coated fabric, the resin coated fabric comprising a fabric with an air-impervious resin coating applied to at least one side of the fabric, the fabric having a bare fabric areal weight of less than 4.52 oz/yd$^2$, the air-impervious resin coating comprising a flexible organic resin containing a mixture of graphene nanoplatelets and a phosphorus-based flame retardant.

2. The inflatable structure of claim 1, wherein,
the air-impervious resin coating is applied to one side of the fabric in a layer measuring from 0.010 inch to 0.045 inch in thickness.

3. The inflatable structure of claim 1, wherein:
the phosphorus-based flame retardant comprises tris(2-butoxy)ethylphosphate.

4. The inflatable structure of claim 1, wherein:
the air-impervious resin coating comprises at least 0.04% by weight of said graphene nanoplatelets.

5. The inflatable structure of claim 1, wherein:
the air-impervious resin coating comprises at least 0.05% by weight of a phosphorus-based flame retardant.

6. The inflatable structure of claim 1, wherein:
The graphene nanoplatelets have an average particle diameter of at least 5 microns.

7. The inflatable structure of claim 1, wherein:
the air-impervious resin coating further comprises at least 0.4% by weight bromine-based flame retardant.

8. The inflatable structure of claim 7, wherein:
the air-impervious resin coating further comprises no more than 0.25% by weight (triisooctylamine)-benzene.

9. The inflatable structure of claim 2, further comprising:
a heat resistant coating applied to the side of the fabric opposite the air-impervious resin coating.

10. The inflatable structure of claim 9, wherein:
the heat resistant coating comprises at least 1% by weight ceramic microspheres.

11. The inflatable structure of claim 10, wherein:
The ceramic microspheres have an average particle size of from 0.3-12 microns.

12. The inflatable structure of claim 1, wherein:
the bare fabric has a grab tensile strength of less than approximately 376 lbs along the warp axis of the fabric.

13. The inflatable structure of claim 1, wherein:
the bare fabric has a grab tensile strength of less than approximately 326 lbs along the fill axis of the fabric.

14. A method of manufacturing a flame-resistant inflatable structure comprising:
selecting a bare fabric having an areal weight of less than 4.52 oz/yd$^2$;

applying an air-impervious resin coating to one side of the bare fabric, the air impervious resin coating comprising a flexible organic resin containing a mixture of graphene nanoplatelets and a phosphorus-based flame retardant added thereto; and forming the fabric into at least one airtight member which, when inflated to a predetermined pressure, forms a self-supporting structure.

15. The method of claim 14, further comprising:

applying a heat resistant coating to the side of the fabric opposite the air-impervious resin coating.

16. The method of claim 15, wherein;

the heat resistant coating comprises at least 0.1% by weight ceramic microspheres.

17. The method of claim 16, wherein;

the ceramic microspheres having an average particle size of 0.3 to 12 microns.

18. The method of claim 14, wherein: the air impervious resin coating is applied in a thickness of from 0.010 to 0.045 inches.

* * * * *